(12) United States Patent
Kuwata (10) Patent No.: US 11,762,609 B2
(45) Date of Patent: Sep. 19, 2023

(54) PRINTING APPARATUS AND DATA PROCESSING METHOD

(71) Applicant: SEIKO EPSON CORPORATION, Tokyo (JP)

(72) Inventor: Kohei Kuwata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/055,433

(22) Filed: Nov. 15, 2022

(65) Prior Publication Data

US 2023/0153043 A1    May 18, 2023

(30) Foreign Application Priority Data

Nov. 17, 2021    (JP) ................................. 2021-186882

(51) Int. Cl.
*G06F 3/12* (2006.01)
*H04N 1/60* (2006.01)

(52) U.S. Cl.
CPC ............ *G06F 3/122* (2013.01); *G06F 3/1224* (2013.01); *H04N 1/60* (2013.01)

(58) Field of Classification Search
CPC ....................................................... G06F 3/122
USPC ....................................................... 358/1.15, 5
See application file for complete search history.

(56) References Cited

U.S. PATENT DOCUMENTS

2004/0218838 A1*  11/2004  Tojo .................... G06F 16/5838
                                                                  382/181

FOREIGN PATENT DOCUMENTS

JP            2016-046793 A       4/2016

* cited by examiner

*Primary Examiner* — Jacky X Zheng
(74) *Attorney, Agent, or Firm* — Global IP Counselors, LLP (57) ABSTRACT

A printing apparatus includes a first memory, a second memory, an input circuit that alternately inputting second reference data and third reference data different from each other to the second memory, a processing circuit that performs first color processing with reference to first reference data in the first memory on print data, second color processing with reference to the second reference data in the second memory on the print data, and third color processing with reference to the third reference data in the second memory to the print data, and a printing mechanism that performs printing.

12 Claims, 9 Drawing Sheets

| | | | COLOR CONVERSION TABLE FOR FIRST COLOR GROUP (FIRST REFERENCE DATA) | | | | COLOR CONVERSION TABLE FOR SECOND COLOR GROUP (SECOND REFERENCE DATA) | | | | COLOR CONVERSION TABLE FOR THIRD COLOR GROUP (THIRD REFERENCE DATA) | | | |
|---|---|---|---|---|---|---|---|---|---|---|---|---|---|---|
| R | G | B | $I_1$ | $I_2$ | $I_3$ | $I_4$ | $I_5$ | $I_6$ | $I_7$ | $I_8$ | $I_9$ | $I_{10}$ | $I_{11}$ | $I_{12}$ |
| 0 | 0 | 0 | ** | ** | ** | ** | ** | ** | ** | ** | ** | ** | ** | ** |
| : | : | : | : | : | : | : | : | : | : | : | : | : | : | : |
| 255 | 255 | 255 | ** | ** | ** | ** | ** | ** | ** | ** | ** | ** | ** | ** |

| R | G | B | $I_1$ | $I_2$ | $I_3$ | $I_4$ | $I_5$ | $I_6$ | $I_7$ | $I_8$ | $I_9$ | $I_{10}$ | $I_{11}$ | $I_{12}$ |
|---|---|---|---|---|---|---|---|---|---|---|---|---|---|---|
| 0 | 0 | 0 | ** | ** | ** | ** | ** | ** | ** | ** | ** | ** | ** | ** |
| ... | ... | ... | ... | ... | ... | ... | ... | ... | ... | ... | ... | ... | ... | ... |
| 255 | 255 | 255 | ** | ** | ** | ** | ** | ** | ** | ** | ** | ** | ** | ** |

Columns $I_1$–$I_4$: COLOR CONVERSION TABLE FOR FIRST COLOR GROUP (FIRST REFERENCE DATA)

Columns $I_5$–$I_8$: COLOR CONVERSION TABLE FOR SECOND COLOR GROUP (SECOND REFERENCE DATA)

Columns $I_9$–$I_{12}$: COLOR CONVERSION TABLE FOR THIRD COLOR GROUP (THIRD REFERENCE DATA)

PRINTING APPARATUS AND DATA PROCESSING METHOD

The present application is based on, and claims priority from JP Application Serial Number 2021-186882, filed Nov. 17, 2021, the disclosure of which is hereby incorporated by reference herein in its entirety.

BACKGROUND

1. Technical Field

The present disclosure relates to a printing apparatus and a data processing method.

2. Related Art

To print image data expressed in elemental colors such as RGB on a printer, it is known in related art to perform image processing, such as resolution conversion for matching the resolution of the image data to the printing resolution of the printer, color conversion for converting the color system of the image data into the color system of each color material used by the printer, and halftoning for binarizing the gray-scales of the image data (JP-A-2016-46793, for example).

When the number of color materials used in the printing increases, the processing period over which the image processing is performed lengthens.

SUMMARY

A printing apparatus for solving the problem described above includes a first memory, a second memory, an input circuit that alternately inputting second reference data and third reference data different from each other to the second memory, a processing circuit that performs first color processing with reference to first reference data in the first memory on print data, second color processing with reference to the second reference data in the second memory on the print data, and third color processing with reference to the third reference data in the second memory to the print data, and a printing mechanism that prints a first color based on the print data on which the first color processing has been performed, prints a second color based on the print data on which the second color processing has been performed, and prints a third color based on the print data on which the third color processing has been performed, and the processing circuit performs the first color processing, the second color processing, and the third color processing in a first order, subsequently performs the first color processing, the second color processing, and the third color processing in a second order, and the first order and the second order differ from each other in that the second color processing and the third color processing are performed in reversed orders.

A data processing method for solving the problem described above includes a first step of performing data processing with reference to first reference data in a first memory, a second step of performing data processing with reference to second reference data in a second memory, a third step of performing data processing with reference to third reference data in the second memory, and an input step of alternately inputting the second reference data and the third reference data different from each other to the second memory. The first step, the second step, and the third step are executed in a first order, and the first step, the second step, and the third step are subsequently executed in a second order. The first order and the second order differ from each other in that the second step and the third step are executed in reversed orders.

DESCRIPTION OF EXEMPLARY EMBODIMENTS

In the sections below, an embodiment of the present disclosure will be described in accordance with the following order:
(1) Configuration of printing apparatus:
(2) Printing process:
(3) Other Embodiments:

(1) Configuration of Printing Apparatus

Figure 1:
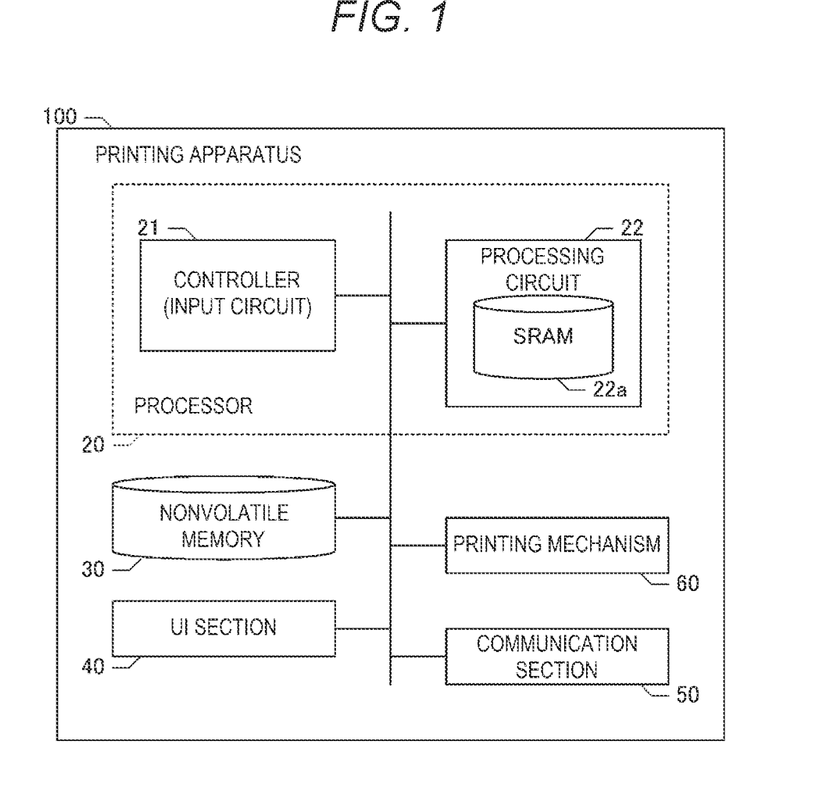
FIG. 1 is a block diagram of a printing apparatus.

FIG. 1 is a block diagram showing the configuration of a printing apparatus 100 according to the embodiment of the present disclosure. The printing apparatus 100 includes a processor 20, a nonvolatile memory 30, a UI section 40, a communication section 50, and a printing mechanism 60. The processor 20 includes a controller 21 and a processing circuit 22. The controller 21 includes a CPU, a ROM, a RAM, and other components, none of which is shown, and can control each portion of the printing apparatus 100 by executing a variety of programs recorded in the nonvolatile memory 30. The processing circuit 22 performs image processing on image data to be printed (print data) and converts the image data into data in a format suitable for printing via the printing mechanism 60. The processing circuit 22 includes an SRAM 22a, which stores reference data referred to during the image processing described above. The controller 21 functions as an "input circuit" when the reference data recorded in the nonvolatile memory 30 are inputted to (stored in) the SRAM 22a of the processing circuit 22.

The processor 20 may be formed of a single chip or a plurality of chips. The processor 20 can employ a variety of configurations, for example, a configuration in which the CPU is replaced with an ASIC, and a configuration in which the CPU and an ASIC cooperate with each other.

The communication section 50 includes a communication interface for communication with external instruments in accordance with a variety of wired or wireless communication protocols. The communication section 50 further includes an interface for communication with a variety of removable memories attached to the printing apparatus 100. The printing apparatus 100 can communicate with a print job generator (not shown), such as a PC, via the communication section 50.

The printing mechanism 60 performs printing on a variety of print media in an inkjet scheme under the control of the processor 20. The printing mechanism 60 includes a transportation mechanism that transports a print medium and a printing head that discharges ink drops onto the print medium. The printing head in the present embodiment is capable of discharging 12 color inks. The 12 color inks are, for example, cyan, light cyan, magenta, light magenta, yellow, black, light black, ultralight black, orange, green, and violet inks, and an overcoat solution. In the present embodiment, ink drops having three sizes, small (S), medium (M), and large (L), can be discharged via nozzles of the printing head.

The UI section 40 includes a touch panel display, a variety of keys and switches, or any other components. The touch panel display includes a display panel that displays a variety of pieces of information under the control of the processor 20 and a touch detection panel superimposed on the display panel, and detects touch operation performed with a person's finger or any other object. The processor 20 can acquire the content of the user's operation via the UI section 40. The processor 20 can display a variety of pieces of information on the display of the UI section 40 to notify the user of the information.

The controller 21 can execute a printing control program that is not shown but is recorded in the nonvolatile memory 30. The printing control program causes the controller 21 to achieve the function of controlling the processing circuit 22 to perform the image processing on the print data, generating converted data having a format suitable for printing performed by the printing mechanism 60, and causing the printing mechanism 60 to perform printing. In the present embodiment, the print data is RGB data in which each pixel is expressed by grayscales in three channels or RGB channels.

Figure 2:
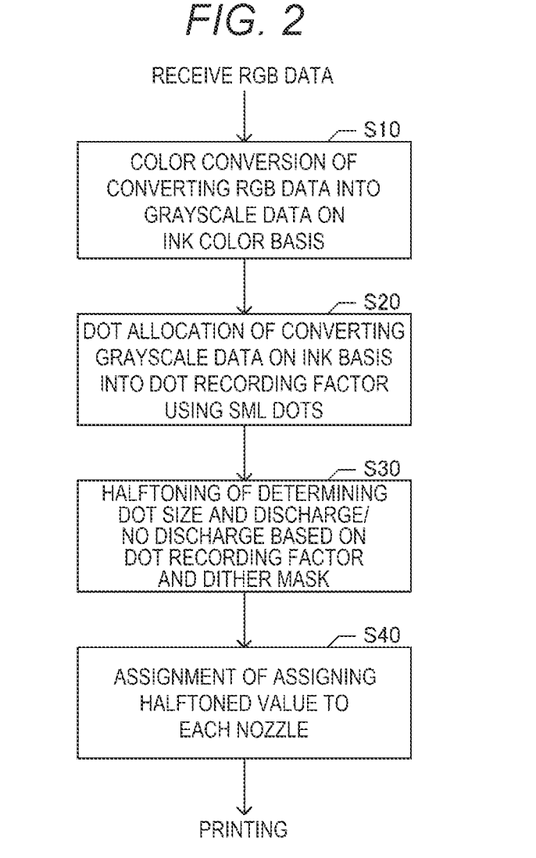
FIG. 2 is a flowchart showing a basic procedure of a printing process.

FIG. 2 is a flowchart showing a basic procedure of processes carried out by the processor 20 when print data is received from the print job generator, such as a PC. Upon reception of the RGB data from the print job generator via the communication unit 50, the controller 21 activates the processing circuit 22 to perform color conversion of converting the RGB data into grayscale data on an ink color basis (step S10), perform dot allocation of converting the grayscale data on an ink color basis into a dot recording factor using the SML dots (step S20), and perform halftoning of determining the dot size and discharge/no discharge based on the dot recording factor and a dither mask (step S30). The controller 21 subsequently controls the processing circuit 22 to perform assignment of assigning the halftoned data (data representing dot size and discharge/no discharge on a pixel basis) to each nozzle of the printing head (step S40). The controller 21 then causes the printing mechanism 60 to perform printing based on the data assigned to each nozzle. The processes in steps S10 to S40 are carried out on a band basis. In the present embodiment, a single band contains data equivalent to 64 lines. The lines used herein are each an area formed of a plurality of pixels arranged in the primary scan direction. The primary scan direction is the direction perpendicular to the direction in which the print medium is transported. Note that resolution conversion is performed in some cases on the RGB data before step S10.

Figure 3:
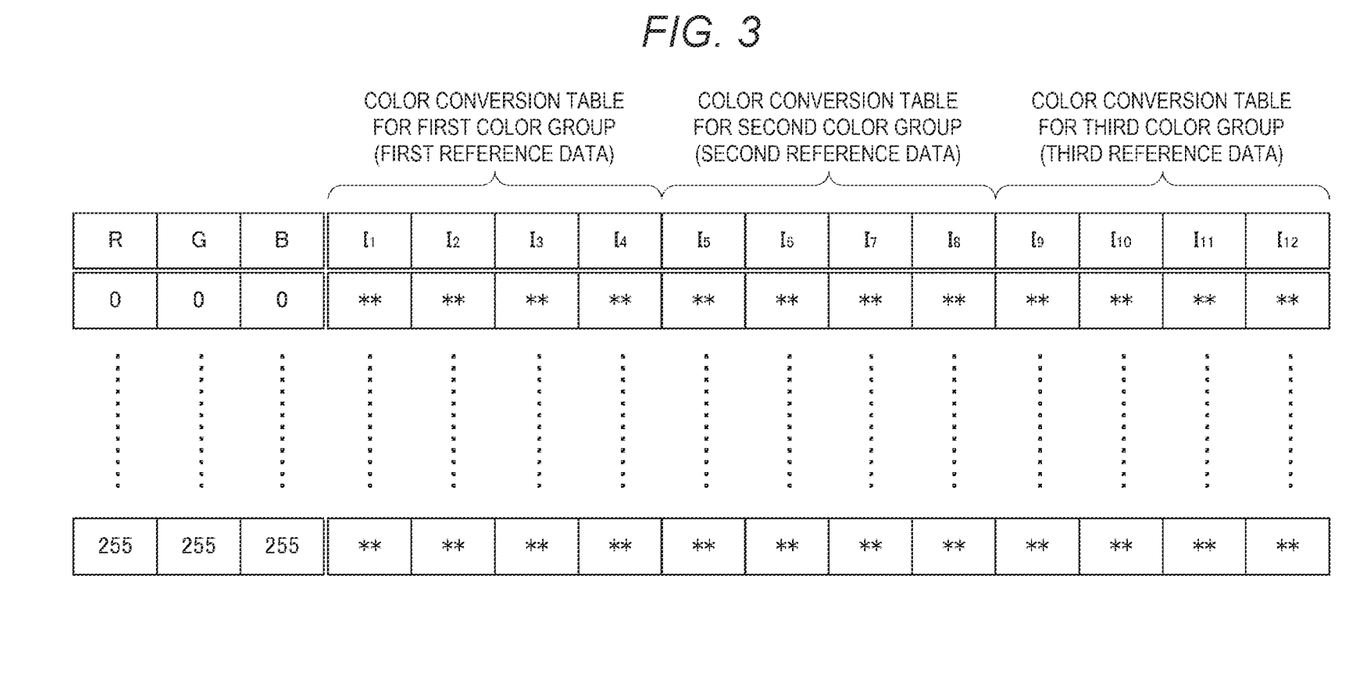
FIG. 3 shows the configuration of color conversion tables.

The color conversion in step S10 is the process of converting the colors indicated by the RGB grayscales at each pixel into grayscales on an ink color basis by referring to color conversion tables. FIG. 3 shows the configuration of the color conversion tables. In the present embodiment, 12 color inks are used. $I_1$ to $I_{12}$ represent the 12 color inks. The description continues on the assumption that the grayscales in each of the RGB channels ranges from 0 to 255 in the present embodiment. The color conversion tables are each a lookup table (LUT) for conversion of X colors out of the $256^3$ colors indicated by the grayscales in the three RGB channels into the colors indicated by the grayscales of the ink colors from $I_1$ to $I_{12}$. The colors other than the X colors are converted into the grayscales of the ink colors through interpolation operation. A plurality of color conversion table sets according to printing conditions are prepared and recorded in the nonvolatile memory 30 in advance.

Before causing the processing circuit 22 to perform the color conversion, the controller 21 reads the color conversion tables recorded in the nonvolatile memory 30 and stores the color conversion tables in the SRAM 22a provided in the processing circuit 22. When the controller 21 instructs the processing circuit 22 to activate the color conversion, the processing circuit 22 refers to the color conversion tables stored in the SRAM 22a and performs the color conversion.

In the present embodiment, the SRAM 22a has a data area capable of storing color conversion tables equivalent to eight color inks at the maximum. Therefore, in the present embodiment, the processing circuit 22 cannot perform the color conversion for the 12 colors with the color conversion tables for the 12 colors concurrently stored in the SRAM 22a. In view of the fact described above, the controller 21 in the present embodiment divides the color conversion tables for the 12 colors into three groups: a first color group; a second color group; and a third color group, and performs the color conversion for one group at a time, that is, four ink colors. In the present embodiment, any combination of ink colors may be assigned to each of the groups. The color conversion table for the first color group, the color conversion table for the second color group, and the color conversion table for the third color group correspond to first reference data, second reference data, and third reference data in the color conversion, respectively (see FIG. 3).

The color conversion process with reference to the color conversion table for the first color group (first reference data) corresponds to first color processing. The color conversion with reference to the color conversion table for the second color group (second reference data) corresponds to second color processing, and the color conversion process with reference to the color conversion table for the third color group (third reference data) corresponds to third color processing. The first color processing, the second color processing, and the third color processing are each a process of converting the four colors together (N=4). The printing mechanism 60 in the present embodiment is a mechanism that performs printing by using 12 (=3 N) color materials (inks).

Figure 5:
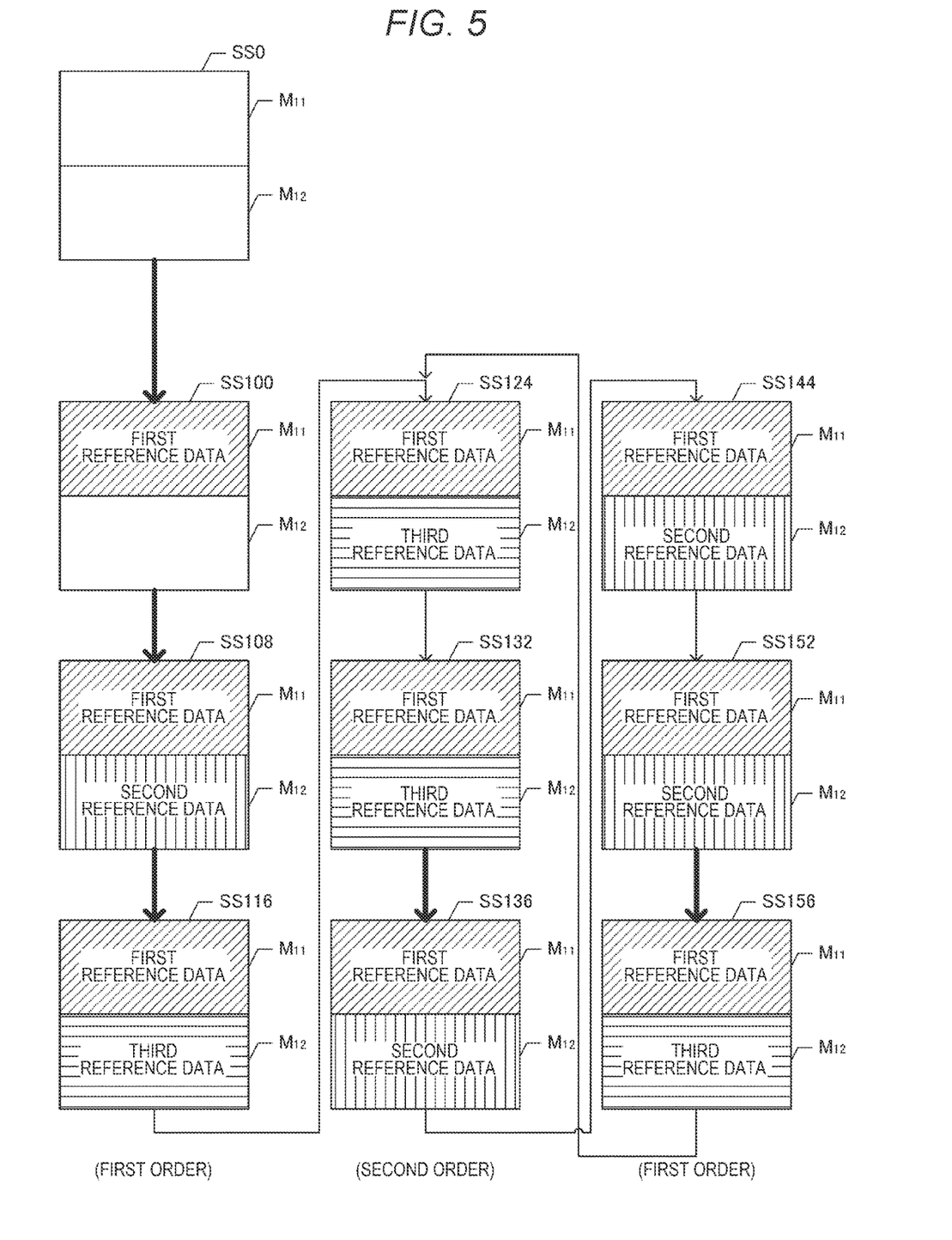
FIG. 5 shows data to be stored in a first memory and a second memory.

The data area, of the SRAM 22a, for color conversion tables for eight colors is divided into two frames before used in the present embodiment, as indicated by SS0 in FIG. 5. The frames are called a first memory $M_{11}$ and a second memory $M_{12}$ for color conversion. The first memory $M_{11}$ and the second memory $M_{12}$ are different areas of the same memory, that is, the SRAM 22a, and during the period for which data stored in one of the two memories is being read by the processing circuit 22, no data can be written to either of the memories. Therefore, for example, during the period for which the processing circuit 22 performs the color conversion by using the color conversion tables for a certain color group stored in the first memory $M_{11}$, the control unit 21 cannot input the color conversion tables for any other color group to (or store the color conversion tables in) the second memory $M_{12}$. The controller 21 therefore performs the color conversion for the 12 colors, which are divided into the 3 groups, by repeatedly storing in one of the frames the color conversion tables for 4 colors in each of the groups and performing the color conversion on that group.

In the present embodiment, the order of the groups on which the color conversion is performed is changed on a band basis to shorten the processing period required to input color conversion tables into the SRAM 22a. As a result, the number of times a color conversion table set is inputted can be reduced as compared with the number of times in a case where the color conversion is performed in a fixed order for all bands, whereby the processing period required to input the color conversion tables can be shortened. The order will be described later in details.

Figure 4:
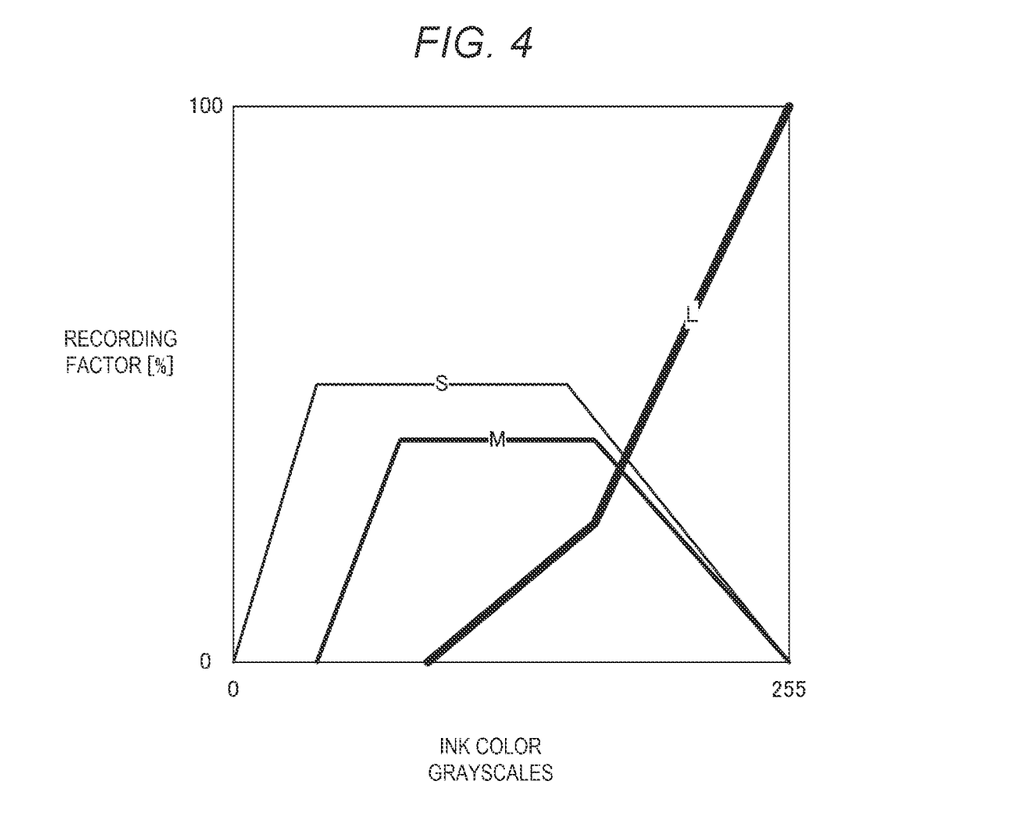
FIG. 4 shows an example of a dot recording factor table.

The dot allocation in step S20 is the process of converting the grayscale data on an ink color basis into the recording factors of ink drops having the sizes described above. FIG. 4 shows an example of a dot recording factor table. The dot recording factor table specifies the relationship of the recording factors of ink drops (dots) having the sizes S, M, and L with the grayscales (256 grayscales, for example) representing the amount of ink, as shown in FIG. 4. A dot recording factor table is specified on an ink color basis. A plurality of sets of dot recording factor tables according to printing conditions are prepared and recorded in the nonvolatile memory 30 in advance. Before the processing circuit 22 carries out the process in step S20, the controller 21 reads the dot recording factor tables recorded in the nonvolatile memory 30 and stores the dot recording factor tables in the SRAM 22a.

The SRAM 22a further has a data area capable of storing dot recording factor tables for eight color inks at the maximum in addition to the aforementioned first memory $M_{11}$ and second memory $M_{12}$ for color conversion. The data area for dot allocation for the eight colors is divided into two frames, as the data area for color conversion is. The frames are called a first memory $M_{21}$ and a second memory $M_{22}$ for dot allocation. The first memory $M_{21}$ and the second memory $M_{22}$ are different areas of the same memory, that is, the SRAM 22a, and during the period for which data stored in one of the two memories is being read by the processing circuit 22, the controller 21 can write no data to the first memory $M_{21}$ or the second memory $M_{22}$. Also in the dot allocation, the controller 21 divides the dot recording factor tables for the eight colors into three groups: a first color group; a second color group; and a third color group, each of the groups containing four ink colors, and causes the processing circuit 22 to perform the dot allocation on one group at a time. The combination of ink colors assigned to each of the groups is the same as the combination in the grouping of the color conversion tables.

The dot recording factor table for the first color group, the dot recording factor table for the second color group, and the dot recording factor table for the third color group correspond to first reference data, second reference data, and third reference data in the dot allocation, respectively. The dot allocation with reference to the dot recording factor table for the first color group (first reference data) corresponds to the first color processing. The dot allocation with reference to the dot recording factor table for the second color group (second reference data) corresponds to the second color processing, and the dot allocation with reference to the dot recording factor table for the third color group (third reference data) corresponds to the third color processing. The first color processing, the second color processing, and the third color processing are each the process of converting, for the four color inks, the ink grayscales at each pixel in the band to be processed into the dot recording factor on an ink size basis (N=4).

In the present embodiment, to shorten the processing period required to input the dot recording factor tables to the SRAM 22a, the order of the color groups on which the dot allocation is performed is changed on a band basis (similar to the order of the color conversion) to reduce the number of times a dot recording factor table set is inputted. The order will be described later in details.

The halftoning in step S30 is the process of determining any of small-dot discharge, medium-dot discharge, large-dot discharge, and no discharge on a pixel basis by using the recording factors of the dots having the sizes described above and a dither mask (dither matrix). In the present embodiment, the halftoning is performed by using a dither mask common to all the ink colors. The dither mask is recorded in advance in the nonvolatile memory 30, and the controller 21 reads the dither mask recorded in the nonvolatile memory 30 before causing the processing circuit 22 to perform the halftoning in step S30 for the first time in a print job and stores the dither mask in the SRAM 22a. A threshold is recorded at each pixel of the dither mask and compared with the dot recording factor (ranging from 0 to 100). When the dither mask is superimposed on the print data having undergone the dot allocation, a threshold $T_H$ stored in the dither mask is compared with the recording factors of the dots having the sizes described above on an overlapping pixel basis and on an ink color basis. The recording factors of the small, medium, and large dots at a pixel of interest are called $S_R$, $M_R$, and $L_R$, respectively. For example, at the pixel of interest, the processing circuit 22 determines to discharge the large dot when $TH \le L_R$, determines to discharge the middle dot when $L_R < T_H \le L_R + M_R$, determines to discharge the small dot when $L_R + M_R < T_H \le L_R + M_R + S_R$, and determines to discharge no ink drop when $L_R + M_R + S_R < T_H$. Halftone data (4-value data), which determines whether any one of the small, medium, and large dots is formed or no ink drop is discharged, is thus generated on an ink basis and on a pixel basis. The halftoning may be performed by using any of a variety of known approaches, and the method described above is not necessarily employed.

The assignment in step S40 is the process of assigning the halftoned data to each nozzle of the printing head. When the printing head discharges ink drops while moving in the primary scan direction, the assignment is made on a pass basis.

The processes in steps S10 to S40 will next be described in detail. In particular, the order of the plurality of types of color processing in S10 and S20 will be described in detail.

(2) Printing Process

FIG. 5 diagrammatically shows the area where the color conversion tables are stored in the SRAM 22a and further shows transition of the color conversion tables to be stored. In the SRAM 22a in the present embodiment, the data area capable of storing the color conversion tables for eight colors is assigned for the color conversion. In the present embodiment, the controller 21 divides the data area for the color conversion into the two frames, the first memory $M_{11}$ and the second memory $M_{12}$, and handles each of the frames as an area where color conversion tables for four colors are stored. The area that is provided in the SRAM 22a and stores the dot recording factor tables is not shown in FIG. 5 because the dot recording factor tables to be stored transition in the same manner in which the color conversion tables shown in FIG. 5 transition.

In the following sections, the printing process will be described in detail with reference to FIG. 5 and FIGS. 6 to 8. In FIG. 5, the oblique-line hatching represents the color conversion tables for the first color group (first reference data), the vertical-line hatching represents the color conversion tables for the second color group (second reference data), and the horizontal-line hatching represents the color conversion tables for the third color group (third reference data). When execution of a new print job is initiated, the first memory $M_{11}$ and the second memory $M_{12}$ for color conversion tables have initially stored no color conversion tables for any of the groups, as indicated by SS0 in FIG. 5. The first memory $M_{21}$ and the second memory $M_{22}$ for dot recording factor tables have similarly stored no dot recording factor tables for any of the groups, as in the case indicated by SS0 in FIG. 5. The data area, of the SRAM 22a, for dither mask also has stored no dither mask.

Figure 6:
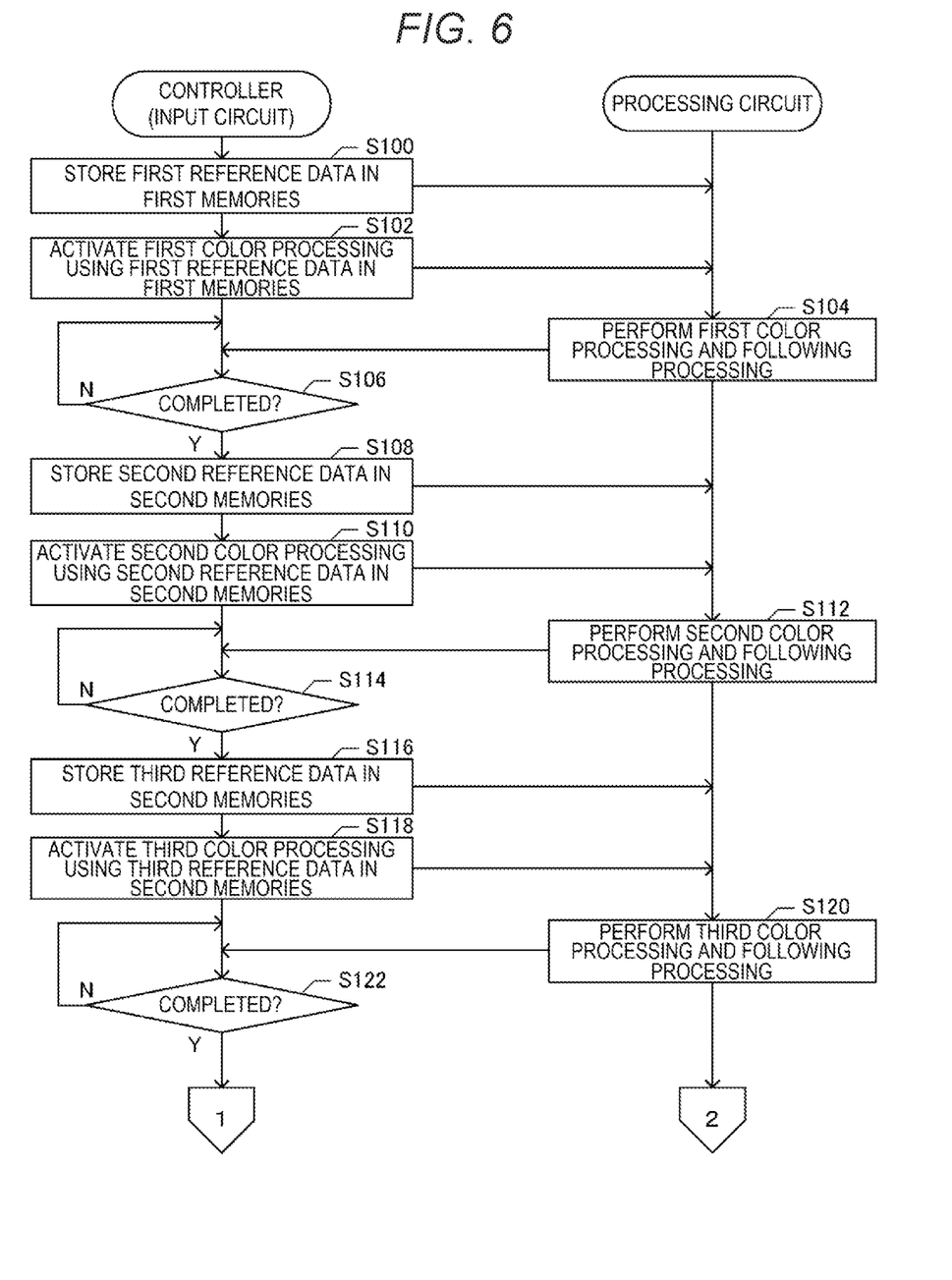
FIG. 6 is a flowchart of a printing process.

When a print job is received from the print job generator, the processes shown in FIGS. 6 to 8 start. Upon reception of a print job from the print job generator, the controller 21 processes the RGB-format image data as print data contained in the print job on a band basis. Processes in steps S100 to S122 in FIG. 6 are those for the first band. Upon reception of the print job, the controller 21 stores the first reference data in the first memories (step S100). That is, the controller 21 refers to the printing conditions (print medium type, print medium size, printing quality, and other factors) specified in the print job, and selects a set of color conversion tables according to the printing conditions. The controller 21 stores the color conversion table for the four colors that belong to the first color group in the selected set in the first memory $M_{11}$ for color conversion tables. SS100 in FIG. 5 shows the state in which the color conversion table for the first color group is stored in the first memory $M_{11}$. The controller 21 further selects a set of dot recording factor tables according to the printing conditions, and stores the selected dot recording factor table for the four colors that belong to the first color group in the first memory $M_{21}$ for dot recording factor tables. The controller 21 further stores the dither mask in the data area, of the SRAM 22a, for the dither mask.

The controller 21 subsequently activates the first color processing using the first reference data in the first memories (step S102). That is, the controller 21 activates the processing circuit 22 to perform the color conversion with reference to the color conversion table for the colors that belong to the first color group stored in the first memory $M_{11}$ for color conversion. As a result, the processing circuit 22 performs the first color processing and the subsequent processing (step S104). In the present embodiment, the first color processing is formed of the color conversion in S10 and the dot allocation in S20, and the subsequent processing corresponds to the processing in S30 and the following steps. Therefore, in step S104, the processing circuit 22 performs the color conversion (S10 in FIG. 2) with reference to the color conversion table for the first color group stored in the first memory $M_{11}$ for color conversion. The processing circuit 22 subsequently performs, on the data having undergone the color conversion, the dot allocation (S20 in FIG. 2) with reference to the dot recording factor table for the four colors that belong to the first color group stored in the first memory $M_{21}$ for dot allocation. The processing circuit 22 subsequently performs the halftoning (S30 in FIG. 2) with reference to the dither mask. The processing circuit 22 performs the assignment (S40 in FIG. 2) to the nozzles based on the data having undergone the halftoning.

When the halftoning (S30) is completed in step S104, the processing circuit 22 is configured to notify the controller 21 of the completion. Upon reception of the completion notification (step S106), the controller 21 then stores the second reference data in the second memories (step S108). That is, the controller 21 stores the color conversion table for the colors that belong to the second color group out of the color conversion table set corresponding to the printing conditions in the second memory $M_{12}$ for color conversion. SS108 in FIG. 5 shows this state. Out of the dot recording factor table set corresponding to the printing conditions, the controller 21 stores the dot recording factor table for the colors that belong to the second color group in the second memory $M_{22}$ for dot allocation. Since the dither mask is common to the inks in the present embodiment, the already stored dither mask is used with no need for re-storage of the dither mask.

The controller 21 then activates the second color processing using the second reference data in the second memories (step S110). That is, the controller 21 activates the processing circuit 22 to perform the color conversion with reference to the color conversion table for the colors that belong to the second color group stored in the second memory $M_{12}$ for color conversion. As a result, the processing circuit 22 performs the second color processing and the subsequent processing (step S112). That is, the processing circuit 22 performs the color conversion (S10) with reference to the color conversion table for the second color group stored in the second memory $M_{12}$ for color conversion. The processing circuit 22 subsequently performs, on the data having undergone the color conversion, the dot allocation (S20) with reference to the dot recording factor table for the four colors that belong to the second color group stored in the second memory $M_{22}$ for dot allocation. The processing circuit 22 subsequently performs the halftoning (S30) with reference to the dither mask. The processing circuit 22 performs the assignment (S40) to the nozzles based on the data having undergone the halftoning.

When the halftoning (S30) in step S112 is completed, the processing circuit 22 notifies the controller 21 of the completion. Upon reception of the completion notification (step S114), the controller 21 then stores the third reference data in the second memories (step S116). That is, the controller 21 stores the color conversion table for the colors that belong to the third color group out of the color conversion table set corresponding to the printing conditions in the second memory $M_{12}$ for color conversion. SS116 in FIG. 5 shows this state. Out of the dot recording factor table set corresponding to the printing conditions, the controller 21 stores the dot recording factor table for the colors that belong to the third color group in the second memory $M_{22}$ for dot allocation. Since the dither mask is common to the inks, the already stored dither mask is used with no need for re-storage of the dither mask.

The controller 21 then activates the third color processing using the third reference data in the second memories (step S118). That is, the controller 21 activates the processing circuit 22 to perform the color conversion with reference to the color conversion table for the colors that belong to the third color group stored in the second memory $M_{12}$ for color conversion. As a result, the processing circuit 22 performs the third color processing and the subsequent processing (step S120). That is, the processing circuit 22 performs the color conversion (S10) with reference to the color conversion table for the third color group stored in the second memory $M_{12}$ for color conversion. The processing circuit 22 subsequently performs, on the data having undergone the color conversion, the dot allocation (S20) with reference to the dot recording factor table for the four colors that belong to the third color group stored in the second memory $M_{22}$ for dot allocation. The processing circuit 22 subsequently performs the halftoning (S30) with reference to the dither mask. The processing circuit 22 performs the assignment (S40) to the nozzles based on the data having undergone the halftoning.

Figure 7:
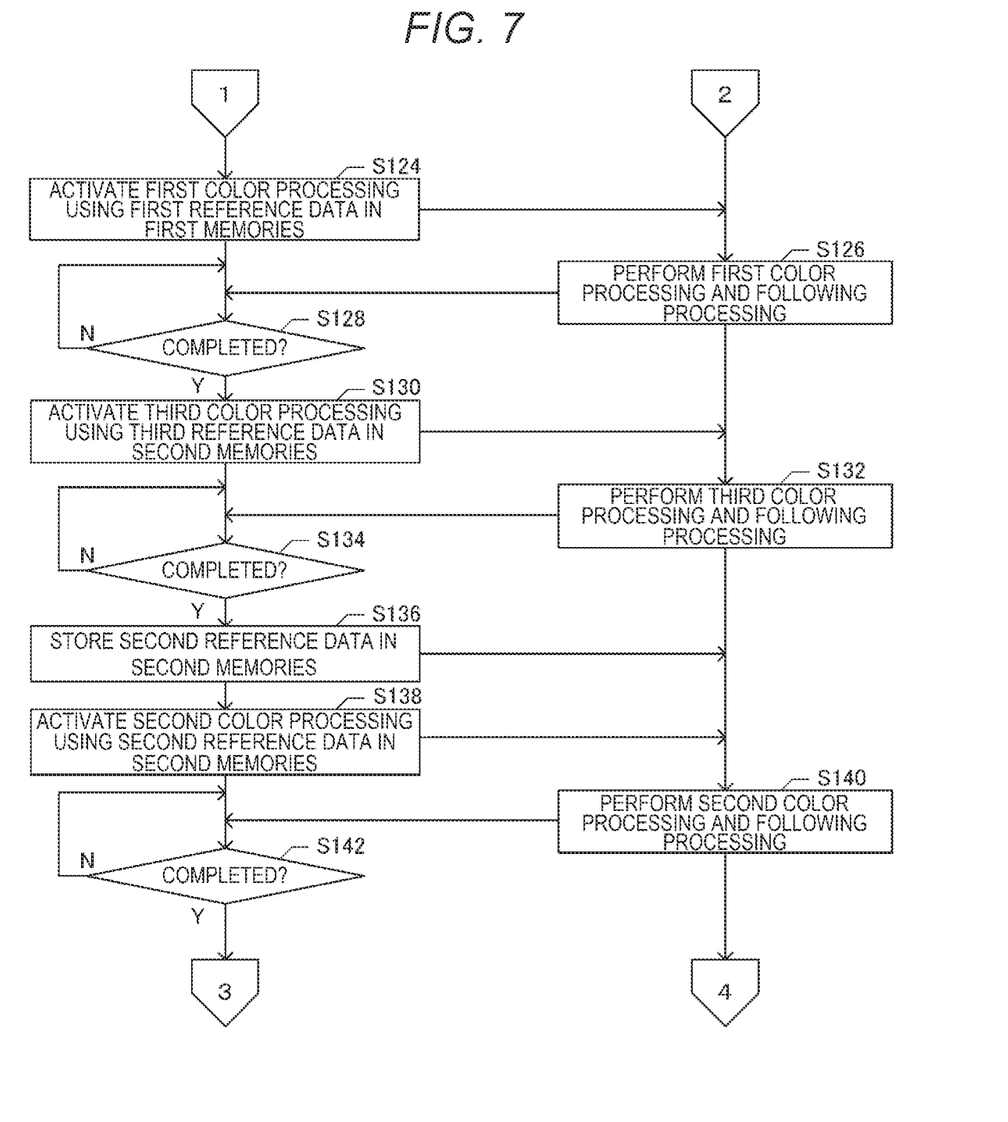
FIG. 7 is a flowchart of the printing process.

When the processes in S100 to S122 are completed, the processes for the first band are completed. When the assignment to the nozzles for one band is completed, the printing mechanism 60 discharges the inks onto the print medium based on the assigned data. In the present embodiment, the processes for the first band are carried out in the order of the first color processing, the second color processing, and the third color processing (first order), as described above. The processes in steps S124 to S142 in FIG. 7 are those for the second band. In the present embodiment, the processes for the second band are carried out in the order of the first color processing, the third color processing, and the second color processing (second order). The first and second orders differ from each other in that the second color processing and the third color processing are performed in reversed order.

When the halftoning in step S120 is completed, the processing circuit 22 is notified of the completion, so that the controller 21 carries out the processes for the second band in response to the completion notification (step S122). That is, the controller 21 activates the first color processing using the first reference data in the first memories (step S124 in FIG. 7). SS124 in FIG. 5 shows the first memory $M_{11}$ and the second memory $M_{12}$ for color conversion at the time of execution of step S124. The same holds true for the first memory $M_{21}$ and the second memory $M_{22}$ for dot allocation. That is, SS124 shows the same state as the state in SS116 at the time when the third color processing is performed on the first band. The controller 21 therefore uses the color conversion table for the first color group stored in the first memory $M_{11}$ for color conversion and the dot recording factor table for the first color group stored in the first memory $M_{21}$ for dot allocation with no change in the tables. The controller 21 therefore omits the process of storing the color conversion table for the first color group and the dot recording factor table for the first color group, and activates the first color processing using the first reference data in the first memories. As a result, the processing circuit 22 performs the first color processing and the subsequent processing (step S126). In step S126, the same process as that in step S104 is carried out by the processing circuit 22. Omission of the process comparable to the process in step S100 before step S124 contributes to reduction in the processing period.

When the halftoning in step S126 is completed, the processing circuit 22 notifies the controller 21 of the completion. Upon reception of the completion notification (step S128), the controller 21 activates the third color processing using the third reference data in the second memories (step S130). As a result, the processing circuit 22 performs the third color processing and the subsequent processing (step S132). SS132 in FIG. 5 shows the first memory $M_{11}$ and the second memory $M_{12}$ for color conversion at the time of execution of step S132. The same holds true for the first memory $M_{21}$ and the second memory $M_{22}$ for dot allocation. That is, SS132 shows the same state with no change as that of SS116 at the time when the third color processing is performed on the first band and as that of SS124 at the time when the first color processing for the second band is performed. The controller 21 therefore uses the color conversion table for the third color group stored in the second memory $M_{12}$ for color conversion and the dot recording factor table for the third color group stored in the second memory $M_{22}$ for dot allocation with no change in the tables. The controller 21 therefore omits the process of storing the color conversion table for the third color group and the dot recording factor table for the third color group, and activates the third color processing using the third reference data in the second memories. As a result, the processing circuit 22 carries out the same process as that in step S120. Omission of the process comparable to the process in step S116 before step S130 contributes to reduction in the processing period.

When the halftoning in step S132 is completed, the processing circuit 22 notifies the controller 21 of the completion. Upon reception of the completion notification (step S134), the controller 21 replaces the third reference data in the second memories with the second reference data (in this case, the controller 21 functions as the input circuit). That is, the controller 21 stores the second reference data in the second memories (step S136). The controller 21 stores the color conversion table for the second color group in the second memory $M_{12}$ for color conversion and further stores the dot recording factor table for the second color group in the second memory $M_{22}$ for dot allocation. SS136 in FIG. 5 shows the state after the replacement. That is, the first reference data in the first memories are retained as it is, and the third reference data are replaced with the second reference data in the second memories.

Subsequent to the step S136 in FIG. 7, the controller 21 activates the second color processing using the second reference data in the second memories (step S138). That is, the controller 21 activates the processing circuit 22 to perform the color conversion with reference to the color conversion table for the colors that belong to the second color group stored in the second memory $M_{12}$ for color conversion. As a result, the processing circuit 22 performs the second color processing and the subsequent processing (step S140). In step S140, the same process as that in step S112 is carried out by processing circuit 22.

The processes in S124 to S142, which will be described later, in FIG. 7 are the processes for the second band. When the assignment of the data for the second band to the nozzles is completed, the printing mechanism 60 discharges print inks onto the print medium based on the assigned data. The processes for the second band are carried out in the order of the first color processing, the third color processing, and the second color processing (second order), as described above. The first order for the first band and the second order for the second band differ from each other in that the second color processing and the third color processing are performed in reversed order. The controller 21 subsequently carries out the processes for the third band in the first order again, that is, the order of the first color processing, the second color processing, the third color processing.

Figure 8:
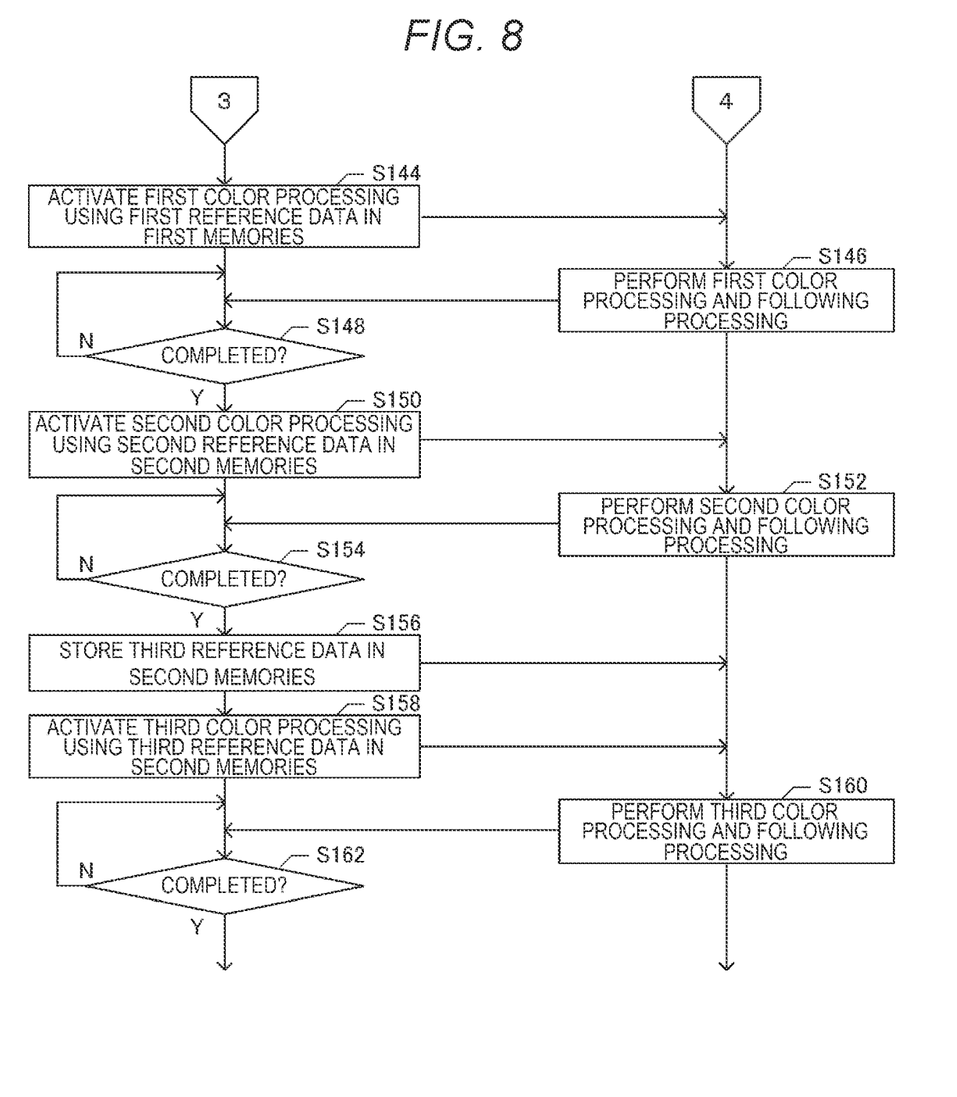
FIG. 8 is a flowchart of the printing process.

When the halftoning in step S140 is completed, the processing circuit 22 notifies the controller 21 of the completion, so that the controller 21 carries out the processes for the third band shown in FIG. 8 in response to the completion notification (step S142). That is, the controller 21 activates the first color processing using the first reference data in the first memories (step S144). Since the color conversion table for the first color group stored in the first memory $M_{11}$ and the dot recording factor table for the first color group stored in the first memory $M_{21}$ are retained (no change from SS136), the controller 21 omits the process of storing the color conversion table for the first color group and the dot recording factor table for the first color group, as indicated by SS144 in FIG. 4. Omission of the process comparable to the process in step S100 contributes to reduction in the overall processing period. As a result of the activation of step S144, the processing circuit 22 performs the first color processing and the subsequent processing (step S146). In step S146, the process comparable to the process in step S126 is carried out.

When the halftoning in step S146 is completed, the processing circuit 22 notifies the controller 21 of the completion. Upon reception of the completion notification (step S148), the controller 21 activates the second color processing using the second reference data in the second memories (step S150). As a result, the processing circuit 22 performs the second color processing and the subsequent processing (step S152). SS152 in FIG. 5 shows the first memory $M_{11}$ and the second memory $M_{12}$ for color conversion at the time of execution of step S152. The same holds true for the first memory $M_{21}$ and the second memory $M_{22}$ for dot allocation. That is, SS152 shows the same state as the states in SS136 and SS144 at the time when the second color processing is performed on the second band. The controller 21 therefore uses the color conversion table for the second color group stored in the second memory $M_{12}$ for color conversion and the dot recording factor table for the second color group stored in the second memory $M_{22}$ for dot allocation with no change in the tables. The controller 21 therefore omits the process of storing the color conversion table for the second color group and the dot recording factor table for the second color group, and activates the second color processing using the second reference data in the second memories. As a result, the processing circuit 22 carries out the same process as that in step S140. Omission of the process comparable to the process in step S136 before step S150 contributes to reduction in the overall processing period.

When the halftoning in step S152 is completed, the processing circuit 22 notifies the controller 21 of the completion. Upon reception of the completion notification (step S154), the controller 21 replaces the second reference data in the second memories with the third reference data. In this case, the controller 21 functions as the input circuit. That is, the controller 21 stores the third reference data in the second memories (step S156). The controller 21 stores the color conversion table for the third color group in the second memory $M_{12}$ for color conversion, and further stores the dot recording factor table for the third color group in the second memory $M_{22}$ for dot allocation. SS156 in FIG. 5 shows the state after the replacement. That is, the first reference data in the first memories are retained as it is, and the second reference data are replaced with the third reference data in the second memories.

Subsequent to the step S156 in FIG. 8, the controller 21 activates the third color processing using the third reference data in the second memories (step S158). That is, the controller 21 activates the processing circuit 22 to perform the color conversion with reference to the color conversion table for the colors that belong to the third color group stored in the second memory $M_{12}$ for color conversion. As a result, the processing circuit 22 performs the third color processing and the subsequent processing (step S160). In step S160, the process comparable to the process in step S132 is carried out.

The processes in steps S144 to S162 are those for the third band. When the assignment of the data for the third band to the nozzles is completed, the printing mechanism 60 discharges print inks onto the print medium based on the assigned data. The processes for the third band are carried out in the order of the first color processing, the second color processing, and the third color processing (first order), as the processes for the first band are carried out, as described above. Since the processes for the second band are carried out in the order of the first color processing, the third color processing, and the second color processing (second order), the processes for the third band are carried out in the first order the processes subsequently to the processes for the second band carried out in the second order.

The processes for the fourth band are carried out in the same second order as the processes for the second band described above are carried out. That is, the color conversion and the subsequent processing are performed in the second order for even-numbered bands and in the first order for odd-numbered bands. The processes for the first band and the processes for the odd-numbered bands after the third band are carried out in the same order, but the first band differs from the odd-numbered bands after the third band in that reference data for all the color groups need to be inputted before the processes for the first band are carried out, whereas the reference data for one group only need to be inputted before the processes for the odd-numbered bands after the third band are carried out.

In the present embodiment, the first memories keep holding the first reference data after the processing circuit 22 starts the first, first color processing until the processing circuit 22 completes the last, first color processing, the series of first color processing being processing for printing with reference to the same first reference data (see FIG. 5). For example, to print entire print data equivalent to one page under the same printing conditions, the same set of color conversion tables and dot recording factor tables according to the printing conditions are used. The first reference data is therefore continuously held in the first memories after the first reference data are stored in the first memories before the first color processing for the first band until the first color processing for the last band is completed for one-page printing. It is noted that the period "after the processing circuit 22 starts the first, first color processing until the processing circuit 22 completes the last, first color processing for printing with reference to the same first reference data" may be a period required to perform printing for less than one page or a period required to perform printing for an entire print job formed of a plurality of pages.

Figure 9:
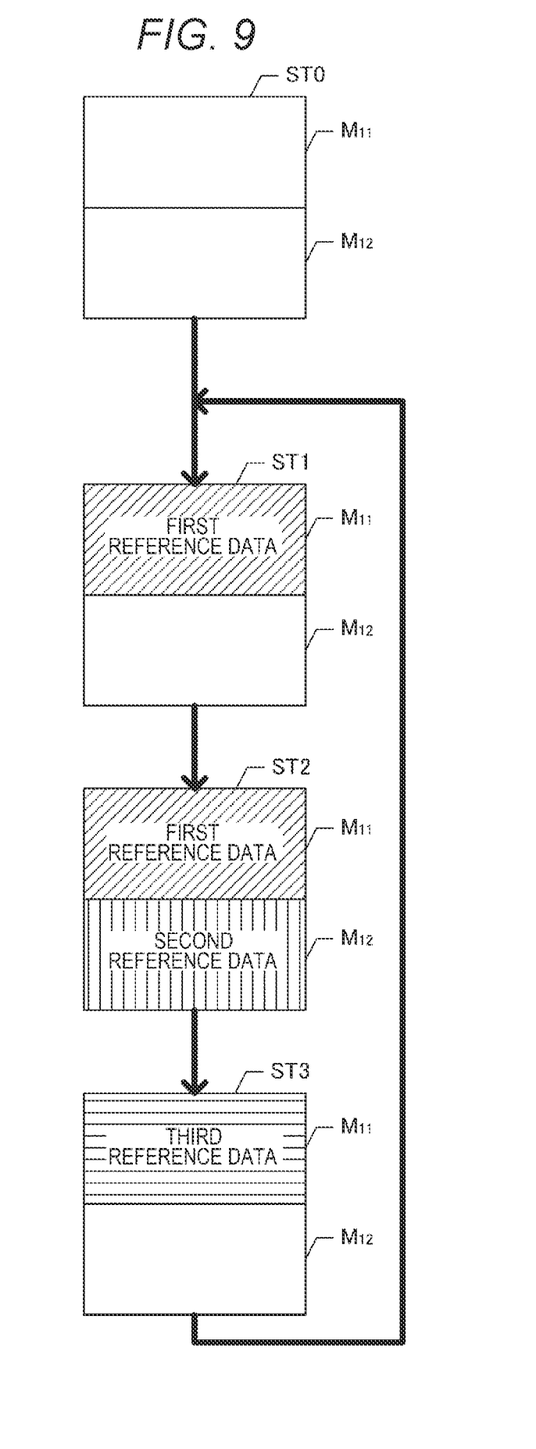
FIG. 9 shows the first memory and the second memory in the processing order in related art.

In the present embodiment, the first memories keep holding the first reference data in the first memories, and the second reference data and the third reference data are swapped in the second memories, and the order of the second color processing with reference to the second reference data and the third color processing with reference to the third reference data is reversed on a band basis, as described above. The processes for all bands are carried out in a fixed order in related art, as shown in FIG. 9. Specifically, the processes for each band are carried out in the following order: the first color processing with reference to the first reference data; the second color processing with reference to the second reference data; and the third color processing with reference to the third reference data. More specifically, the first reference data is stored in the first memory $M_{11}$ (ST1), and first color processing is then performed. Subsequently, the second reference data is stored in the second memory $M_{12}$ (ST2), and second color processing is then performed. Subsequently, the first reference data in the first memory $M_{11}$ is replaced with the third reference data, the second reference data stored in the second memory $M_{12}$ is erased (ST3), and third color processing is then performed. ST1 to ST3 described above are repeated on a band basis.

In the related-art configuration shown in FIG. 9, the reference data is always inputted to (stored in) the SRAM 22a on a band basis (process of storing reference data) before the three types of color processing. The thick arrows each represent that reference data equivalent to one group is inputted when the state at the start point of the arrow transitions to the state at the end point of the arrow. That is, the reference data is inputted always three times in the processes for each band. Therefore, let T be the period required to store reference data for four colors that belong to one group in the SRAM 22*a*, and the period required to store the reference data for each band is 3 T in the related-art configuration.

FIG. 5 shows the states of the memories in the present embodiment, with SS124 to SS136 indicating the states of the memories for the second band and the following even-numbered bands, and SS144 to SS156 indicating the states of the memories for the third band and the following odd-numbered bands. The thick arrows each represent that reference data is inputted when the state at the start point of the arrow transitions to the state at the end point of the arrow. In the present embodiment, in the second band and the following bands, reference data for four ink colors (one group) is inputted only once for each band, as indicated by the thick arrows in FIG. 5. Therefore, in the present embodiment, the period required in each band to store reference data is T, which is ⅓ the length of the period required in related art. Therefore, in the related-art configuration, there may be a period during which the printing mechanism 60 stops operating to wait for the completion of the printing process in the middle of the execution of one print job. In contrast, the present embodiment prevents such a downtime from occurring and therefore prevents a resultant decrease in the printing quality.

Provided that the period required for the processing circuit 22 to refer to the reference data for one color group (including four color inks) and carry out the processes in S10 to S30 in FIG. 2 be comparable to T described above, the processes in S10 to S30 take 3 T for print data equivalent to one band. Therefore, in the related-art configuration, the processes for a single band take a period of 6 T, which is the result of addition of a period of 3 T required to store the reference data in the SRAM 22*a* to a period of 3 T required to carry out the processes in S10 to S30 based on the reference data. In the present embodiment, in the processes for a single band, the period required to store reference data is T, and the period required to carry out the processes in S10 to S30 for print data equivalent to the single band with reference to the reference data is 3 T, so that the period required to carry out the processes for the single band is 4 T. The period required to carry out the processes for a single band in the present embodiment is therefore shortened to ⅔ the period in related art. The throughput (amount of processing per unit period) of the printing process in the present embodiment is 1.5 times higher than the throughput in related art.

The present embodiment, which employs the method for dividing the data area capable of storing reference data for eight colors into two frames each equivalent to four colors, permanently holding the first reference data for four colors in one of the frames, and inputting the second reference data for four colors or the third reference data for four colors into the other frame and using the inputted reference data, eliminates the need to provide the SRAM 22*a* with a data area that stores reference data for 12 color inks and can therefore reduce the cost.

(3) Other Embodiments

The embodiment described above is an example for implementing the present disclosure, and a variety of other embodiments can be employed. For example, the present disclosure is applicable not only to a printing apparatus but also to a multifunctional instrument with a printing mechanism. The printing mechanism only needs to be capable of printing first, second, and third colors, and may be configured to use a variety of color materials such as ink and toner to perform printing. The first and second memories may each be a memory of any type as long as the memory can store data referred to by the processing circuit. The printing apparatus according to the present disclosure may be formed of a plurality of apparatuses. For example, the input circuit and the processing circuit may be components separate from each other, such as a PC and a printer.

The processing circuit may be configured to perform the first color processing, the second color processing, and the third color processing in the first order, subsequently perform the first color processing, the second color processing, and the third color processing in the second order, and the first and second orders may differ from each other in that the second color processing and the third color processing in reversed orders. Therefore, one of the first order and the second order may be any of an order A of the first color processing, the second color processing, and the third color processing, an order B of the second color processing, the first color processing, and the third color processing, and an order C of the second color processing, the third color processing, and the first color processing. In this case, the other of the first order and the second order may be any of an order D of the first color processing, the third color processing, and the second color processing, an order E of the third color processing, the first color processing, and the second color processing, and an order F of the third color processing, the second color processing, and the first color processing. The combination of the first order and the second order may therefore, for example, be A and E, A and F, or B and F in place of A and D.

Let n be any natural number, and focus on the n-th band and the (n+1)-th band. The processes for the n-th band may be carried out in the first order, and the processes for the (n+1)-th band may be carried out in the second order. The combination of the first and second orders may be any of those described above. Therefore, as in the embodiment described above, the processes for each of the odd-numbered bands may not necessarily be carried out in the order of the first color processing, the second color processing, and the third color processing, and the processes for each of the even-numbered bands may not necessarily be carried out in the order of the first color processing, the third color processing, and the second color processing. For example, the order of the first color processing, the second color processing, and the third color processing (first order), the order of the first color processing, the third color processing, and the second color processing (second order), the order of the second color processing, the first color processing, and the third color processing (third order), the order of the third color processing, the first color processing, and the second color processing (fourth order) may be repeated. A further greater number of orders may, of course, be repeated.

In the embodiment described above, a mask common to the ink colors is employed as the dither mask referenced to in the halftoning, but dither masks different among the ink colors may be used. In this case, the approach according to the present disclosure may be employed also in the halftoning in terms of the reference data input order and the reference data processing order. That is, the halftoning may be so configured that the first reference data, the second reference data, and the third reference data are each threshold data for the halftoning and the first color processing, the second color processing, and the third color processing are each halftoning with reference to the threshold data for the halftoning. At least one of the color conversions, the dot allocation, and the halftoning may be configured to employ an approach for changing the reference data input order and the reference data processing order on a band basis, or all the color conversion, the dot allocation, and the halftoning may be configured to employ the approach.

Furthermore, the printing apparatus may have a color specifying mode, and in this case, the first reference data may be data corresponding to a color specified in the color specifying mode. In printing in the color specifying mode, it is determined to print a specified image (company logo, for example) with a specified spot color ink. As for the specified image, the color conversion is performed by using a specified color conversion table relating to the spot ink irrespective of the type of the print medium. In a print job not using the color specifying mode, when the page M and the page M+1 differ from each other in terms of the type of the print medium contained in the print job, different color conversion table sets for 12 colors are used for the pages M and M+1. On the other hand, in a print job using the color specifying mode, the same color conversion table is used at least for the spot color ink for printing the specified image even when the pages M and M+1 differ from each other in terms of the type of the print medium. Storing the color conversion table for the spot color ink (corresponding to part of first reference data) in the first memories for printing the specified image therefore allows use of the spot-color conversion table stored in the first memories as it is also between the pages M and M+1 (when first memories keep holding first reference data). The processing period spent to store the color conversion table for the spot color in the period after the processes for the last band of the page M are carried out but before the first band of the page M+1 is printed can therefore be omitted. As for the remaining 11 colors, color conversion tables different from those for the page M can be used in accordance with the type of the print medium of the page M+1.

The first color processing, the second color processing, and the third color processing may each be the process of collectively processing at least N colors (N is integer greater than or equal to two), and the printing mechanism may be a mechanism that performs printing by using 3N or more color materials. In the embodiment described above, N=4, the three types of color processing correspond to the color conversion and dot allocation for four ink colors, and the printing mechanism performs printing by using twelve color inks, but not necessarily. A configuration in which N=4 and the printing mechanism can perform printing by using thirteen or more color materials can, for example, be employed. For example, N=2 may instead be satisfied. In this case, although the printing mechanism capable of printing using eight color materials is provided, the approach according to the present disclosure may be employed when printing using six out of the eight color materials is performed. It is, of course noted that N=1 may be satisfied and the printing mechanism can perform printing by using four color materials. The three types of color processing each do not need to be a process using the same number of colors. For example, the first color processing may use two colors, the second and third color processing may use three colors, and the printing mechanism may perform printing by using eight color inks.

The printing apparatus may include three or more memories that store data referred to by the processing circuit. In this case, the processing circuit may perform four or more types of color processing by using the three or more memories. Also in this case, the approach according to the present disclosure may be employed when any two of the three or more memories are used.

The data processing method according to the present disclosure is also applicable to a variety of types of data processing other than color processing in a printing apparatus. That is, the data processing method according to the present disclosure includes a first step of performing data processing with reference to first reference data in a first memory, a second step of performing data processing with reference to second reference data in a second memory, a third step of performing data processing with reference to third reference data in the second memory, and an input step of alternately inputting the second reference data and the third reference data different from each other to the second memory. In the data processing method, the first step, the second step, and the third step are executed in a first order, the first step, the second step, and the third step are subsequently executed in a second order, and the first order and the second order differ from each other in that the second step and the third step are executed in reversed orders. When the first memory and the second memory are provided, and there is a restriction that prevents data from being written to the second memory during data processing with reference to the first reference data stored in the first memory, employing the data processing method according to the present disclosure can shorten the overall processing period.

Furthermore, the present disclosure is also applicable as a program and a method executed by a computer. The system, the program, and the method described above are achieved in some cases in the form of a single apparatus, or achieved in other cases by using parts provided in a plurality of apparatuses, and therefore include a variety of aspects. The present disclosure is also applicable to a case where any electronic instrument including no printing mechanism performs data processing by using predetermined reference data. The present disclosure can be changed as appropriate, for example, can be partially formed of software or can be partially formed of hardware. The present disclosure can further be implemented in the form of a medium that records a program that controls the system. The medium that records the program may, of course, be a magnetic recording medium or a semiconductor memory, and the same fully holds true for any recording medium to be developed in the future.

What is claimed is:
1. A printing apparatus comprising:
a first memory;
a second memory;
an input circuit that alternately inputting second reference data and third reference data different from each other to the second memory;
a processing circuit that performs first color processing with reference to first reference data in the first memory on print data, second color processing with reference to the second reference data in the second memory on the print data, and third color processing with reference to the third reference data in the second memory to the print data; and
a printing mechanism that prints a first color based on the print data on which the first color processing has been performed, prints a second color based on the print data on which the second color processing has been per- formed, and prints a third color based on the print data on which the third color processing has been performed, wherein the processing circuit performs the first color processing, the second color processing, and the third color processing in a first order, subsequently performs the first color processing, the second color processing, and the third color processing in a second order, and the first order and the second order differ from each other in that the second color processing and the third color processing are performed in reversed orders.

2. The printing apparatus according to claim 1,
wherein one of the first order and the second order is any of an order of the first color processing, the second color processing, and the third color processing, an order of the second color processing, the first color processing, and the third color processing, and an order of the second color processing, the third color processing, and the first color processing, and another one of the first order and the second order is any of an order of the first color processing, the third color processing, and the second color processing, an order of the third color processing, the first color processing, and the second color processing, and an order of the third color processing, the second color processing, and the first color processing.

3. The printing apparatus according to claim 1,
wherein the processing circuit performs the first color processing, the second color processing, and the third color processing in the second order, and subsequently performs the first color processing, the second color processing, and the third color processing in the first order.

4. The printing apparatus according to claim 1,
wherein the input circuit
in one of the first order and the second order, replaces the second reference data with the third reference data in the second memory after the second color processing is completed but before the third color processing is initiated, and in another one of the first order and the second order, replaces the third reference data with the second reference data in the second memory after the third color processing is completed but before the second color processing is initiated.

5. The printing apparatus according to claim 1,
wherein the first memory keeps holding the first reference data after the processing circuit initiates the first color processing for the first time until the processing circuit completes the first color processing for the last time, the series of first color processing being processing for printing with reference to the same first reference data.

6. The printing apparatus according to claim 1,
wherein the first color processing, the second color processing, and the third color processing are each the process of collectively processing at least N colors (N is integer greater than or equal to two), and the printing mechanism is a mechanism that performs printing by using 3N or more color materials.

7. The printing apparatus according to claim 1,
wherein the first reference data, the second reference data, and the third reference data are each a color conversion table, and the first color processing, the second color processing, and the third color processing are each the process of causing the color conversion table to generate grayscales of a color material associated with the color conversion table.

8. The printing apparatus according to claim 1,
wherein the first reference data, the second reference data, and the third reference data are each data that specifies a recording factor for each size of an ink drop, the first color processing, the second color processing, and the third color processing are each the process of acquiring the recording factor for each size of the ink drop, and the printing mechanism is an inkjet mechanism that performs printing by discharging ink drops having a size determined based on the acquired recording factor.

9. The printing apparatus according to claim 1,
wherein the first reference data, the second reference data, and the third reference data are each data on a threshold, and the first color processing, the second color processing, and the third color processing are each halftoning with reference to the data on the threshold.

10. The printing apparatus according to claim 1,
wherein the first memory and the second memory are different areas of a single memory, and during a period for which the processing circuit reads a content in one of the first and second memories, the processing circuit is not allowed to perform writing onto either of the memories.

11. The printing apparatus according to claim 1,
wherein the printing apparatus has a color specifying mode, and the first reference data is data corresponding to a color specified in the color specifying mode.

12. A data processing method comprising:
a first step of performing data processing with reference to first reference data in a first memory;
a second step of performing data processing with reference to second reference data in a second memory;
a third step of performing data processing with reference to third reference data in the second memory; and
an input step of alternately inputting the second reference data and the third reference data different from each other to the second memory, wherein the first step, the second step, and the third step are executed in a first order, and the first step, the second step, and the third step are subsequently executed in a second order, and the first order and the second order differ from each other in that the second step and the third step are executed in reversed orders.

* * * * *